UNITED STATES PATENT OFFICE.

JOHAN D. FREDERIKSEN, OF LITTLE FALLS, NEW YORK.

COMPOSITION FOR CURDLING MILK OR CREAM.

1,046,766.  Specification of Letters Patent. Patented Dec. 10, 1912.

No Drawing.  Application filed March 6, 1912.  Serial No. 682,012.

*To all whom it may concern:*

Be it known that I, JOHAN D. FREDERIKSEN, a citizen of the United States, residing at Little Falls, in the county of Herkimer and State of New York, have invented a new and useful Improvement in Compositions for Curdling Milk or Cream, of which the following is a specification.

This invention relates to a composition of matter which is designed for direct admixture in a dry state to milk or cream for curdling the same and producing pudding or ice cream.

The composition consists in its most complete form of rennet ferment, sugar, a flavoring ingredient, preferably a coloring ingredient, a calcium salt, such as calcium hypophosphite, and usually a gelatinous substance, such as gum tragacanth. The sugar dilutes the rennet ferment so that the latter does not act too violently upon the milk; it also increases the bulk of the composition and facilitates the handling, weighing and measuring of the same, and it also furnishes sweetening for the ultimate product. The calcium salt has the effect of restoring to pasteurized or sterilized milk or cream the property of curdling quickly under the action of the rennet ferment. The object of the gum tragacanth is to bind the volatile oil of the flavoring ingredient which otherwise, being simply mixed with the sugar, would be apt to evaporate so that the composition would lose its flavor in a comparatively short time.

In the usual practice dry gum tragacanth is soaked in sufficient water to form a smooth paste and is then thoroughly mixed with the flavoring matter. In the case of vanilla, for instance, 43 grams of dry gum, having been soaked in water, is mixed with 216 cubic centimeters of a concentrated extract of vanilla, preferably about ten times as strong as the usual flavoring extract of commerce, and with the coloring ingredient, if any is used. This mixture is then added to and thoroughly incorporated in about 32 pounds of finely granulated sugar and the whole mixture is dried at a low temperature, say about 120° F. It is then ground into a moderately fine powder and thoroughly mixed with about 10 grams of rennet powder and about 57 grams of calcium hypophosphite.

The above process is typical for a number of flavors besides vanilla, such as orange, lemon, maple, pistachio, raspberry, &c., any of which may be substituted for vanilla in suitable proportion.

If the flavor used is chocolate, coffee, caramel or the like, no gelatinous substance is needed to bind the flavoring matter and the gum tragacanth is omitted. In other respects the process is essentially the same as described for vanilla and other similar flavors.

The quantities or proportions of the several ingredients may of course be varied to suit various tastes and circumstances.

When raw milk or raw cream is used the calcium salt may be omitted.

The dry composition is added directly to lukewarm milk or cream at the rate of about three and one-half ounces to a quart and thoroughly mixed with the same by stirring for about half a minute. The milk or cream is then allowed to rest and curdles quickly, forming a pudding or a mixture suitable for the production of ice cream. This dry rennet preparation contains approximately 1 part by weight of dry rennet powder and 200 parts of sugar. This very large proportion of sugar dilutes the rennet powder to such an extent that the preparation can be added in the dry state to the milk without danger of unevenly coagulating the milk. For illustration, 1 part of the dry preparation can be added to about 10 parts of milk. In the dry rennet preparations now known the salt or sugar is contained in such small proportion that it operates mainly as a preservative, and these preparations are invariably used by dissolving them in water before mixing them with milk and this is necessary in order to avoid uneven coagulation. In the herein described dry preparation the sugar acts as a diluent and permits the admixture of the preparation in a dry state to the milk without first dissolving the preparation in water, thereby avoiding the addition of water to the milk.

I claim as my invention:

1. The herein described dry composition of matter comprising rennet ferment and sugar approximately in the proportion of 1 part by weight of rennet powder and 200 parts of sugar, the same forming a curdling composition which can be mixed in a dry state with the milk, substantially as set forth.

2. The herein described dry composition of matter comprising rennet ferment, sugar, a flavoring ingredient, and a gelatinous substance, substantially as set forth.

3. The herein described dry composition of matter comprising rennet ferment, sugar, a flavoring ingredient and a calcium salt, substantially as set forth.

4. The herein described dry composition of matter comprising rennet ferment, sugar, a flavoring ingredient, a calcium salt, and a gelatinous substance, substantially as set forth.

Witness my hand in the presence of two subscribing witnesses.

JOHAN D. FREDERIKSEN.

Witnesses:
S. J. SECKNER,
E. L. G. TOBERG.